Figure 1:
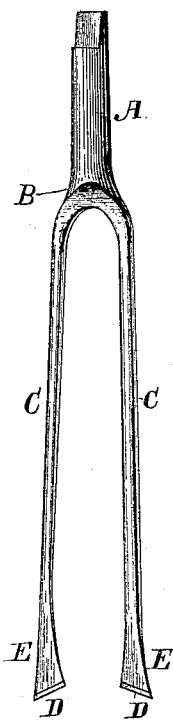
Figure 2:
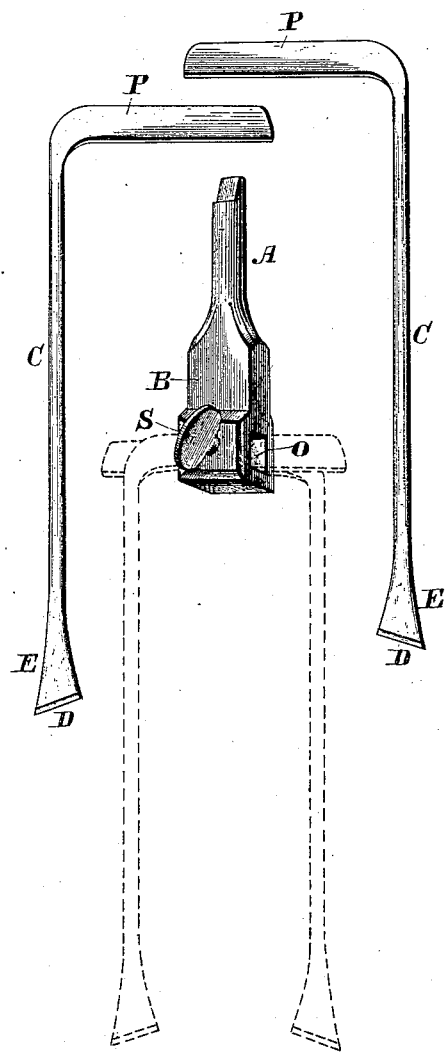
Figure 3:
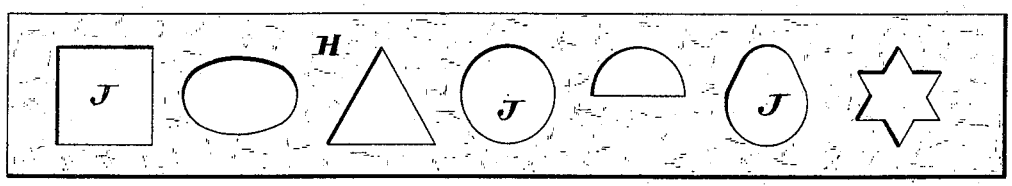
Figure 4:
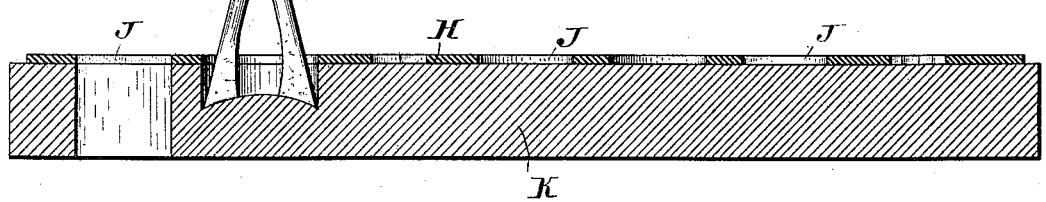

(No Model.) 2 Sheets—Sheet 1.

C. SNEDEKUM.
FORK DRILL.

No. 337,351. Patented Mar. 2, 1886.

ATTEST:
J. Henry Kaiser.
Harry L. Amer.

INVENTOR:
Charles Snedekum,
By F. H. J. van Emster
Attorney.

(No Model.) 2 Sheets—Sheet 2.

C. SNEDEKUM.
FORK DRILL.

No. 337,351. Patented Mar. 2, 1886.

ATTEST.
Harry L. Amer
Ed Gudschinsky

INVENTOR.
Charles Snedekum.

United States Patent Office.

CHARLES SNEDEKUM, OF BAY CITY, MICHIGAN.

FORK-DRILL.

SPECIFICATION forming part of Letters Patent No. 337,351, dated March 2, 1886.

Application filed September 6, 1884. Serial No. 142,432. (No model.)

*To all whom it may concern:*

Be it known that I, CHARLES SNEDEKUM, a citizen of the United States, residing at Bay City, in the county of Bay and State of Michigan, have invented certain new and useful Improvements in Drills, of which the following is a specification.

My invention has for its object to produce a drill which is adapted to the boring or cutting of a hole of any desired shape in cross-section in wood, brass, iron, stone, or other substance. Not only is the drill adapted to the boring of holes of different shapes, but may be so adjusted as to vary the size of the hole at pleasure.

To these ends the improved drill is made with two cutting edges or teeth supported on spring-arms, which may or may not be capable of relative adjustment. The spring-arms of the drill are made to vibrate or assume such shape during their rotation as may be necessary to produce the desired shape of hole by means of a former, within which the drill is placed, as will be hereinafter more fully described.

In order that my invention may be more fully understood, I will proceed to describe it with reference to the accompanying drawings, in which—

Figure I is a perspective view of a forked drill made in accordance with the present invention. Fig. II shows detached the several parts making up the preferred form of the drill. Fig. III is a plan view of the former or guide. Fig. IV is a vertical section showing the drill in operation.

The drill consists, essentially, of a stem, A, capable of being inserted in the stock, and a body, B, having spring-arms C, which may be formed in one piece with said body, as shown in Fig. I; or, when it is desired to have them adjustable, so as to adapt them to form a hole of any size, they may be made with flattened tongues P, adapted to enter a socket, O, in the bottom of body B, wherein they are fixed in any desired position by set-screw S. At the bottom the arms C are flared radially of the axis of the stem A, or approximately so, and provided with sharpened cutting-edges D, which are so inclined as to bring their outer edges first in contact with the substance to be bored.

With the drill as above described is employed any suitable former for guiding the drill in its rotation. One form of such a former has been shown in Figs. III and IV, in which H is a block or plate of steel or other material of sufficient hardness. J are apertures therein of circular, square, elliptical, star, or other form, in any one of which the drill may be placed when the said former is laid upon the block, K, of wood, stone, iron, or other substance to be bored. It will now be readily seen that if the drill be rotated the spring-arms will be made by contact with the walls of the guides or forms J to follow any path desired, according to the shape of said forms, and when operated by a brace or drill-press will bore a hole of the required regular or irregular shape.

Having thus described my invention, the following is what I claim as new therein and desire to secure by Letters Patent:

1. A fork-drill consisting of a pair of bowed spring-arms secured together at the top, and each arm provided with a chisel-edge at the bottom, substantially as described, whereby the arms may be twisted one across the other, to cause the drill to bore a hole of any desired contour, as set forth.

2. A fork-drill consisting of arms C C, having cutting-edges D D, and a slotted body, B, provided with a stem, A, and a binding-screw, S, substantially as described.

3. A fork-drill consisting of two adjustable spring-arms, C C, bowed at their upper ends, as at P, and provided with right and left chisel-edges, as specified, in combination with a slotted body, B, and a screw, S, for clamping said arms at any desired adjustment, and the pattern-plate H, in which it is adapted to operate, all for the purpose set forth.

In testimony whereof I affix my signature in presence of two witnesses.

CHARLES SNEDEKUM.

Witnesses:
JOSEPH P. HAFFEY,
CHARLES LAVENE.